United States Patent
Roudbari et al.

(10) Patent No.: US 9,298,300 B2
(45) Date of Patent: Mar. 29, 2016

(54) DISPLAYS WITH INTEGRATED TOUCH AND IMPROVED IMAGE PIXEL APERTURE

(71) Applicant: Apple Inc., Cupertino, CA (US)

(72) Inventors: Abbas Jamshidi Roudbari, Sunnyvale, CA (US); Cheng-Ho Yu, Cupertino, CA (US); Marduke Yousefpor, San Jose, CA (US); Shih Chang Chang, San Jose, CA (US); Ting-Kuo Chang, Cupertino, CA (US); Yu-Cheng Chen, San Jose, CA (US)

(73) Assignee: Apple Inc., Cupertino, CA (US)

( * ) Notice: Subject to any disclaimer, the term of this patent is extended or adjusted under 35 U.S.C. 154(b) by 100 days.

(21) Appl. No.: 14/226,710

(22) Filed: Mar. 26, 2014

(65) Prior Publication Data

US 2014/0327632 A1 Nov. 6, 2014

Related U.S. Application Data

(60) Provisional application No. 61/818,342, filed on May 1, 2013.

(51) Int. Cl.
*G06F 3/041* (2006.01)
*G02F 1/1333* (2006.01)
*G06F 3/044* (2006.01)

(52) U.S. Cl.
CPC .......... *G06F 3/0412* (2013.01); *G02F 1/13338* (2013.01); *G06F 3/041* (2013.01); *G06F 3/044* (2013.01); *G02F 2201/40* (2013.01); *G06F 2203/04103* (2013.01)

(58) Field of Classification Search
CPC .................................................. G02B 26/001
See application file for complete search history.

(56) References Cited

U.S. PATENT DOCUMENTS

| | | | |
|---|---|---|---|
| 8,183,516 B2 * | 5/2012 | Augusto | H01L 27/146 250/214.1 |
| 8,581,878 B2 | 11/2013 | Chen et al. | |
| 2007/0229424 A1 | 10/2007 | Hayashi et al. | |
| 2008/0012808 A1 * | 1/2008 | Kurahashi | G02F 1/134363 345/87 |
| 2012/0044203 A1 * | 2/2012 | Ishizaki | G06F 3/0412 345/174 |
| 2012/0062511 A1 | 3/2012 | Ishizaki et al. | |
| 2012/0127413 A1 | 5/2012 | Shin et al. | |
| 2012/0249519 A1 * | 10/2012 | Cummings | G02B 26/001 345/214 |
| 2013/0093697 A1 | 4/2013 | Sun | |

FOREIGN PATENT DOCUMENTS

CN 202976049 6/2013

* cited by examiner

*Primary Examiner* — Gerald Johnson
(74) *Attorney, Agent, or Firm* — Treyz Law Group, P.C.; Joseph F. Guihan

(57) ABSTRACT

A display may be provided with integral touch functionality. The display may include a common electrode layer having row electrodes arranged in rows and column electrodes interposed between the row electrodes of each row. The row electrodes may be electrically coupled by conductive paths. The row and column electrodes may be coupled to touch sensor circuitry that uses the row and column electrodes to detect touch events. Each electrode of the common electrode layer may cover a respective portion of an array of pixels. Each pixel of the display may have a respective aperture. The conductive paths that electrically couple row electrodes of the common electrode layer may cover or otherwise block some light from passing through pixels, resulting in reduced apertures. Dummy structures may be provided for other pixels that modify the apertures of the other pixels to match the reduced apertures associated with the conductive paths.

24 Claims, 10 Drawing Sheets

DISPLAYS WITH INTEGRATED TOUCH AND IMPROVED IMAGE PIXEL APERTURE

This application claims priority to U.S. provisional patent application No. 61/818,342 filed May 1, 2013, which is hereby incorporated by reference herein in its entirety.

BACKGROUND

This relates generally to displays, and, more particularly, to displays such as liquid crystal displays.

Displays are widely used in electronic devices to display images. Displays such as liquid crystal displays display images by controlling liquid crystal material associated with an array of image pixels. A typical liquid crystal display has a color filter layer and a thin film transistor layer formed between polarizer layers. The color filter layer has an array of pixels each of which includes color filter elements of different colors. The thin film transistor layer contains an array of thin film transistor circuits. The thin film transistor circuits can be adjusted to control the amount and color of light that is produced by each pixel. Thin film transistor circuitry in a typical pixel array includes data lines and gate lines for distributing data and control signals.

A layer of liquid crystal material is interposed between the color filter layer and the thin film transistor layer. During operation, the circuitry of the thin film transistor layer applies signals to an array of electrodes in the thin film transistor layer in response to data and gate line signals. This produces electric fields that extend from each electrode through the liquid crystal layer to an associated portion of a ground plane. The electric fields control the orientation of liquid crystal material in the liquid crystal layer and change how the liquid crystal material affects polarized light.

Each image pixel is characterized by a respective aperture that defines how much light can pass through that image pixel. It can be challenging to maintain uniformity across the image pixels of a display. For example, metal structures such as signal paths are sometimes used to route signals across the display. These metal structures can block some light from passing through some of the image pixels, which reduces the aperture of the affected image pixels. Other image pixels that are not blocked by the metal structures may have apertures that are greater than the apertures of the affected image pixels, which results in non-uniform brightness across the display.

To maintain display brightness uniformity, an opaque grid such as a black matrix can be used to reduce the aperture of all image pixels (e.g., even pixels that are not obstructed by metal structures). However, with reduced pixel apertures, the overall brightness of the display is reduced and the display tends to consume additional power to ensure sufficient brightness levels. It would therefore be desirable to be able to provide improved displays with brightness uniformity.

SUMMARY

A display may be provided with integral touch functionality. The display may include a transparent common electrode layer having row electrodes arranged in rows and column electrodes interposed between the row electrodes of each row. The row electrodes may be electrically coupled by conductive paths (e.g., conductive paths that are not electrically coupled to the column electrodes). The row and column electrodes may be coupled to touch sensor circuitry that uses the row and column electrodes to detect touch events. The display may include an array of pixels arranged in pixel rows and pixel columns. Each electrode of the common electrode layer may cover a respective portion of the array of pixels.

Each pixel of the display may have a respective aperture. The aperture may be partially defined by openings in an opaque grid such as a black matrix structure formed in a color filter layer or a metal grid formed in a metal layer. The conductive paths that electrically couple row electrodes of the common electrode layer may cover or otherwise block some light from passing through pixels (e.g., resulting in reduced apertures). Dummy structures may be provided for other pixels that partially define (e.g., modify) the apertures of the other pixels to match the reduced apertures associated with the conductive paths. For example, the conductive paths may cover a first portion of a first row of pixels, whereas the dummy structures may cover a second portion of a second row of pixels. In this scenario, the dummy structures may be sized so that the area of the second portion is substantially equal to the area of the first portion. The dummy structures may be floating metal paths provided for each pixel or may be dummy cross-lines that extend across and are electrically coupled to respective electrodes of the common electrode layer.

If desired, the dummy structures may be electrically coupled to respective electrodes of the common electrode layer using conductive via structures. The conductive via structures may potentially cover portions of the image pixels. The conductive paths may be provided with dummy via structures that have substantially equal areas as the conductive via structures to help ensure display uniformity.

Further features of the invention, its nature and various advantages will be more apparent from the accompanying drawings and the following detailed description of the preferred embodiments.

DETAILED DESCRIPTION

Displays are widely used in electronic devices. For example, displays may be used in computer monitors, laptop computers, media players, cellular telephones and other handheld devices, tablet computers, televisions, and other equipment. Displays may be based on plasma technology, organic-light-emitting-diode technology, liquid crystal structures, etc.

Liquid crystal displays are popular because they can exhibit low power consumption and good image quality. Liquid crystal display structures are sometimes described herein as an example.

Figure 1:
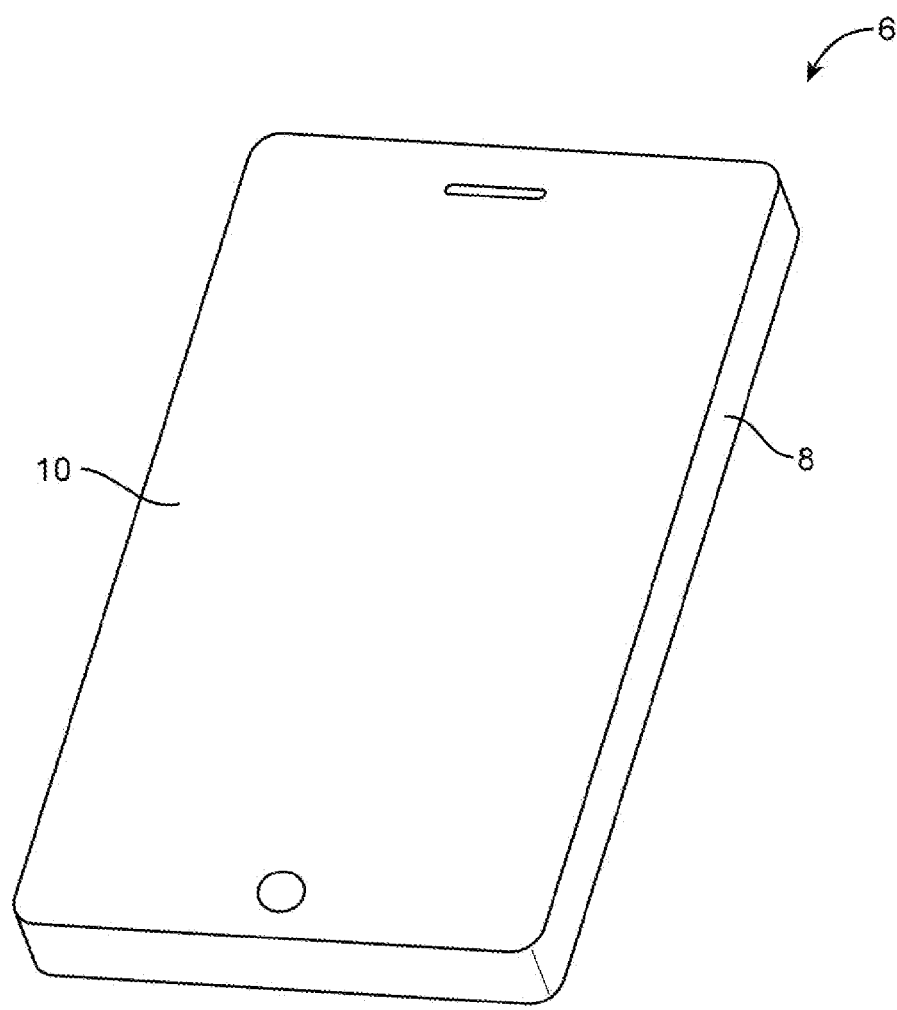
FIG. 1 is a perspective view of an illustrative display such as a liquid crystal display of the type that may be provided with dummy structures to ensure display uniformity in accordance with an embodiment of the present invention.

A perspective view of an illustrative electronic device with a display is shown in FIG. 1. As shown in FIG. 1, electronic device 6 may have a housing such as housing 8. Housing 8 may be formed from materials such as plastic, glass, ceramic, metal, fiber composites, and combinations of these materials. Housing 8 may have one or more sections. For example, device 6 may be provided with a display housing portion and a base housing portion that are coupled by hinges. In the arrangement of FIG. 1, device 6 has a front face and a rear face. Display 10 of FIG. 1 is mounted on the front face of housing 8. Other configurations may be used if desired.

Display 10 may be a liquid crystal display. A touch sensor array may be incorporated into display 10 (e.g., to form a touch screen display). The touch sensor may be based on acoustic touch technology, force sensor technology, resistive sensor technology, or other suitable types of touch sensor. With one suitable arrangement, the touch sensor portion of display 10 may be formed using a capacitive touch sensor arrangement. With this type of configuration, display 10 may include a touch sensor array that is formed from rows and columns of capacitive touch sensor electrodes.

Figure 2:
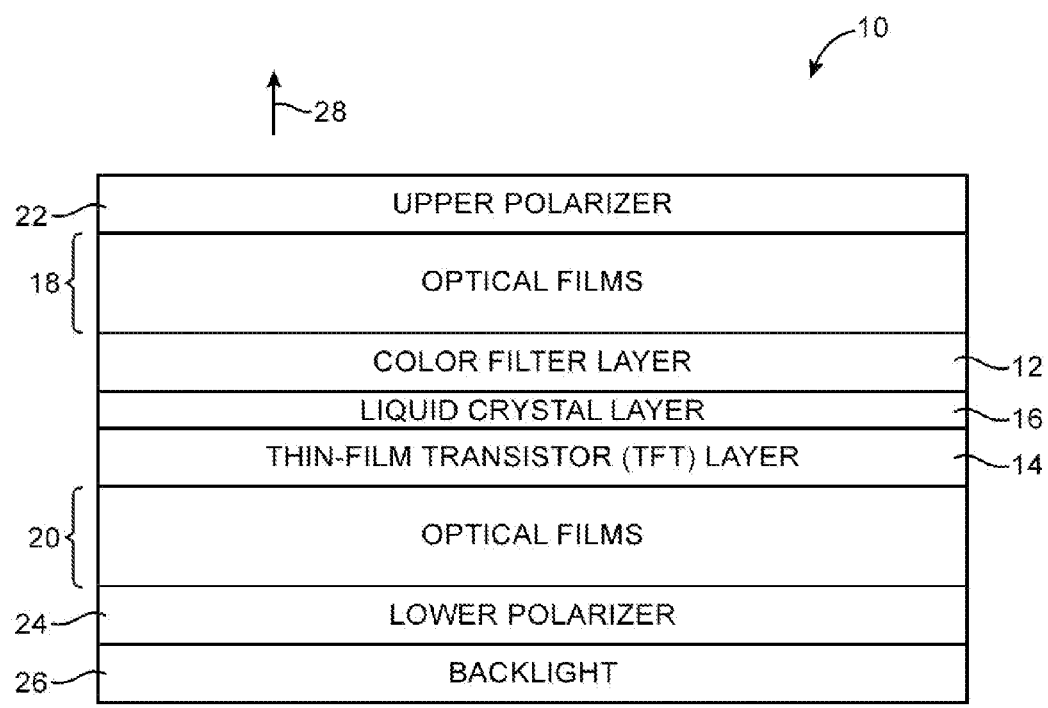
FIG. 2 is cross-sectional side view of an illustrative display in accordance with an embodiment of the present invention.

A cross-sectional side view of a portion of a display of the type that may be used in forming display 10 of FIG. 1 is shown in FIG. 2. As shown in FIG. 2, display 10 may include color filter (CF) layer 12 and thin-film-transistor (TFT) layer 14. Color filter layer 12 may include an array of colored filter elements. In a typical arrangement, the pixels of layer 12 each include three types of colored pixels (e.g., red, green, and blue subpixels). Liquid crystal (LC) layer 16 includes liquid crystal material and is interposed between color filter layer 12 and thin-film-transistor layer 14. Thin-film-transistor layer 14 may include electrical components such as thin film transistors, capacitors, and electrodes for controlling the electric fields that are applied to liquid crystal layer 16.

Optical film layers 18 and 20 may be formed above and below color filter layer 12, liquid crystal layer 16, and thin-film-transistor layer 14. Optical films 18 and 20 may include structures such as quarter-wave plates, half-wave plates, diffusing films, optical adhesives, and birefringent compensating layers.

Display 10 may have upper and lower polarizer layers 22 and 24. Backlight 26 may provide backside illumination for display 10. Backlight 26 may include a light source such as a strip of light-emitting diodes. Backlight 26 may also include a light-guide plate and a back reflector. The back reflector may be located on the lower surface of the light-guide panel to prevent light leakage. Light from the light source may be injected into an edge of the light-guide panel and may scatter upwards in direction 28 through display 10. An optional cover layer such as a layer of coverglass may be used to cover and protect the layers of display 10 that are shown in FIG. 2.

Touch sensor structures may be incorporated into one or more of the layers of display 10. In a typical touch sensor configuration, an array of capacitive touch sensor electrodes may be implemented using pads and/or strips of a transparent conductive material such as indium tin oxide. Other touch technologies may be used if desired (e.g., resistive touch, acoustic touch, optical touch, etc.). Indium tin oxide or other transparent conductive materials or non-transparent conductors may also be used in forming signal lines in display 10 (e.g., structures for conveying data, power, control signals, etc.).

In black and white displays, color filter layer 12 can be omitted. In color displays, color filter layer 12 can be used to impart colors to an array of image pixels. Each image pixel may, for example, have three corresponding liquid crystal diode subpixels. Each subpixel may be associated with a separate color filter element in the color filter array. The color filter elements may, for example, include red (R) color filter elements, blue (B) color filter elements, and green (G) color filter elements. These elements may be arranged in rows and columns. For example, color filter elements can be arranged in stripes across the width of display 10 (e.g., in a repeating patterns such as a RBG pattern or BRG pattern) so that the color filter elements in each column are the same (i.e., so that each column contains all red elements, all blue elements, or all green elements). By controlling the amount of light transmission through each subpixel, a desired colored image can be displayed.

The amount of light transmitted through each subpixel can be controlled using display control circuitry and electrodes. Each subpixel may, for example, be provided with a transparent indium tin oxide electrode. The signal on the subpixel electrode, which controls the electric field through an associated portion of the liquid crystal layer and thereby controls the light transmission for the subpixel, may be applied using a thin film transistor. The thin film transistor may receive data signals from data lines and, when turned on by an associated gate line, may apply the data line signals to the electrode that is associated with that thin-film transistor.

Figure 3:
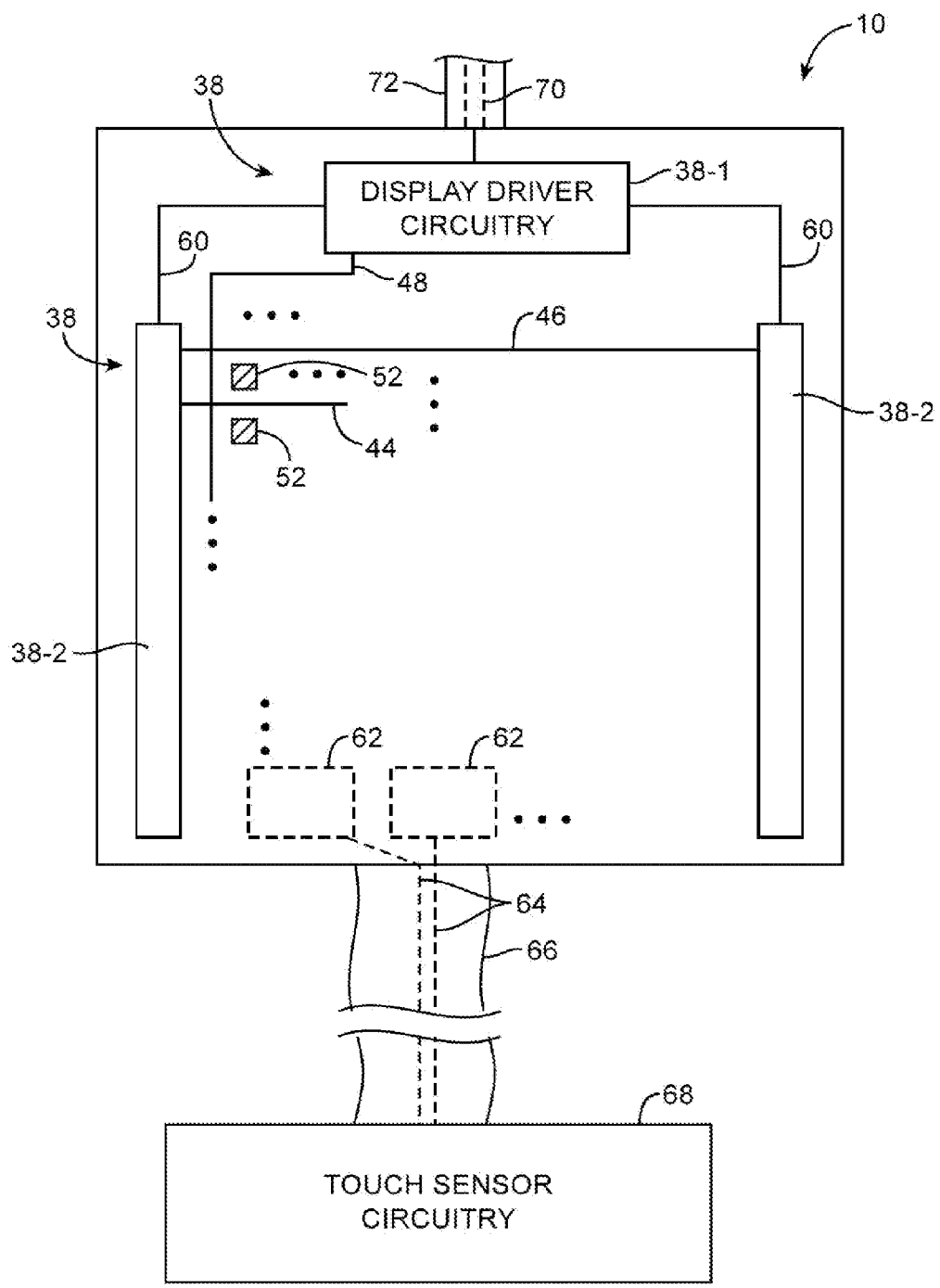
FIG. 3 is an illustrative diagram showing how a display may be provided with image pixel structures and touch sensor elements in accordance with an embodiment of the present invention.

A top view of an illustrative display is shown in FIG. 3. As shown in FIG. 3, display 10 may include an array of image pixels 52. Each image pixel may have an electrode that receives a data line signal from an associated transistor and a common electrode. The common electrodes of display 10 may be formed from a layer of patterned indium tin oxide or other conductive planar structures. The patterned indium tin oxide structure or other conductive structures that are used in forming the common plane for image pixels 52 may also be used in forming capacitive touch sensor elements 62.

As illustrated by touch sensor elements 62 of FIG. 3, touch sensor elements (electrodes) may be coupled to touch sensor circuitry 68. Touch sensor elements 62 may include rectangular pads of conductive material, vertical and/or horizontal strips of conductive material, and other conductive structures. Signals from elements 62 may be routed to touch sensor processing circuitry 68 via traces 64 on flex circuit cable 66 or other suitable communications path lines.

In a typical arrangement, there are fewer capacitor electrodes 62 in display 10 than there are image pixels 52, due to the general desire to provide more image resolution than touch sensor resolution. For example, there may be hundreds or thousands of rows and/or columns of pixels 52 in display 10 and only tens or hundreds of rows and/or columns of capacitor electrodes 62.

Display 10 may include display driver circuitry 38. Display driver circuitry 38 may receive image data from processing circuitry in device 6 using conductive lines 70 in path 72. Path 72 may be, for example, a flex circuit cable or other communications path that couples display driver circuitry 38 to integrated circuits on a printed circuit board elsewhere in device 6 (as an example).

Display driver circuitry 38 may include circuitry 38-1 and circuitry 38-2. Circuitry 38-1 may be implemented using one or more integrated circuits (e.g., one or more display driver integrated circuits). Circuitry 38-2 (sometimes referred to as gate line and Vcom driver circuitry) may be incorporated into circuitry 38-1 or may be implemented using thin film transistors on layer 14 (FIG. 2). Paths such as paths 60 may be used to interconnect display driver circuitry 38-1 and 38-2. Display driver circuitry 38 may also be implemented using external circuits or other combinations of circuitry, if desired.

Display driver circuitry 38 may control the operation of display 10 using a grid of signal lines such as data lines 48, gate lines 46, and Vcom lines (paths) 44. Lines 48, 46, and 44 may form conductive paths for signals that control an array of image subpixels such as subpixels 52 in display 10. Subpixels 52 (which are sometimes referred to as pixels) may each be formed from electrodes that give rise to an electric field and a portion of liquid crystal layer 16 (FIG. 2) that is controlled by that electric field.

Figure 4:
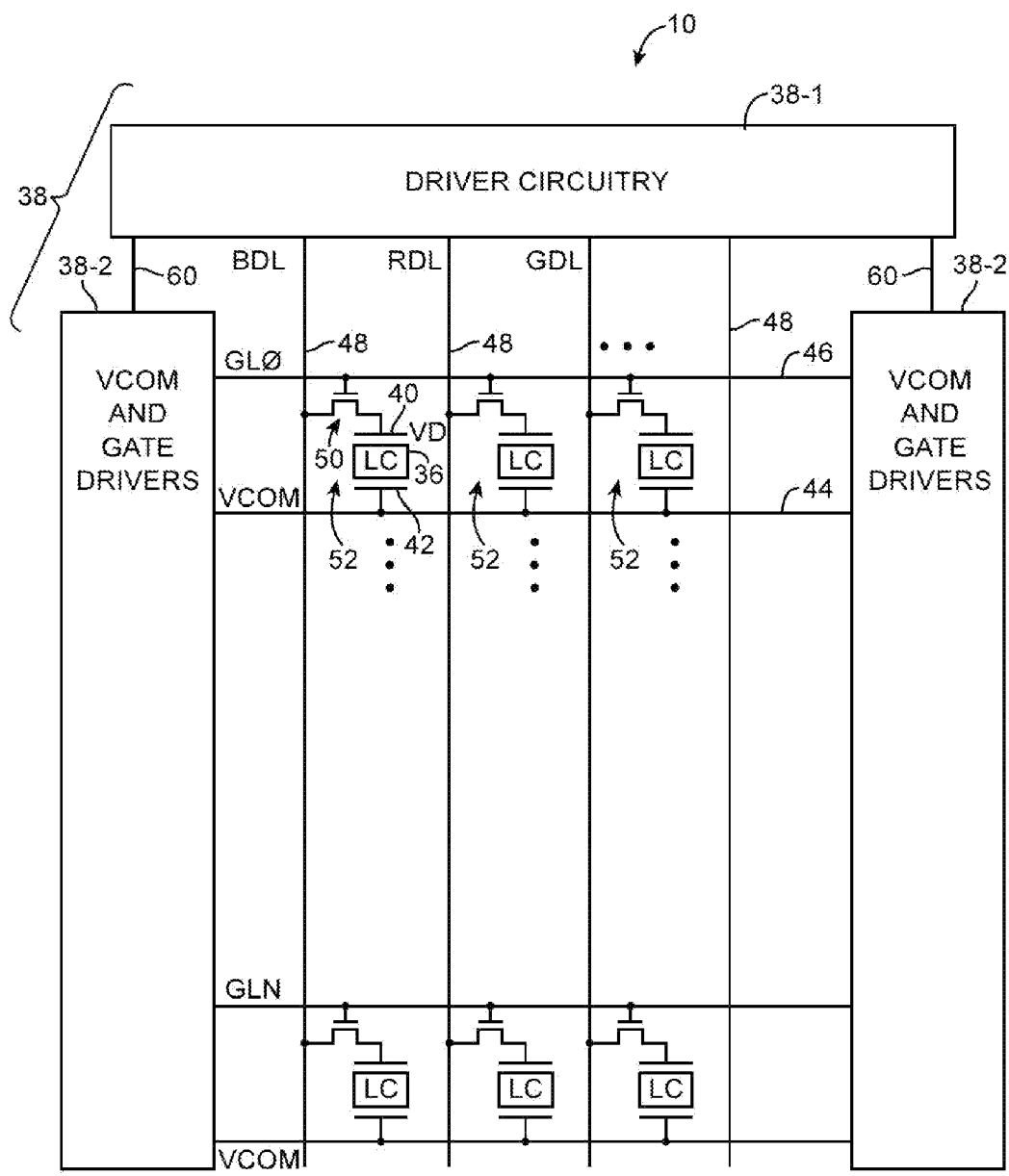
FIG. 4 is a circuit diagram of an illustrative display having rows and columns of image pixels in accordance with an embodiment of the present invention.

As shown in FIG. 4, pixels 52 in display 10 may each be associated with a portion such as portion 36 of liquid crystal layer 16 of FIG. 2. By controlling transmission through pixels 52, images may be displayed on display 10.

Data lines 48 may include lines for addressing pixels of different colors (i.e., pixels associated with color filter elements of different colors). For example, data lines 48 may include blue data lines that carry blue data line signals BDL, red data lines that carry red data line signals RDL, and green data lines that carry green data line signals GDL. Signals BDL, RDL, and GDL may be analog signals having voltages ranging from −5 volts to 5 volts (as an example).

In each row of the pixel array of display 10, a given one of lines 44 may be used to provide a voltage Vcom (sometimes referred to as a reference voltage, power plane voltage or ground voltage) to the set of electrodes 42 in that row. Digital gate line control signals GL0 . . . GLN may be generated on respective gate lines 46 by driver circuitry 38-2. Each gate line may be coupled to the gate of an associated one of control transistors 50 in the same row as that gate line. When a row of control transistors 50 is turned on by asserting a given gate line control signal, the control transistors in that row will each route the voltage on their associated data line to their associated electrode 40. The voltage difference between each electrode 40 and its associated electrode 42 gives rise to an electric field that is used in controlling the state of the liquid crystal material in an associated liquid crystal portion 36 (i.e., a portion of layer 16 of FIG. 2).

Figure 5:
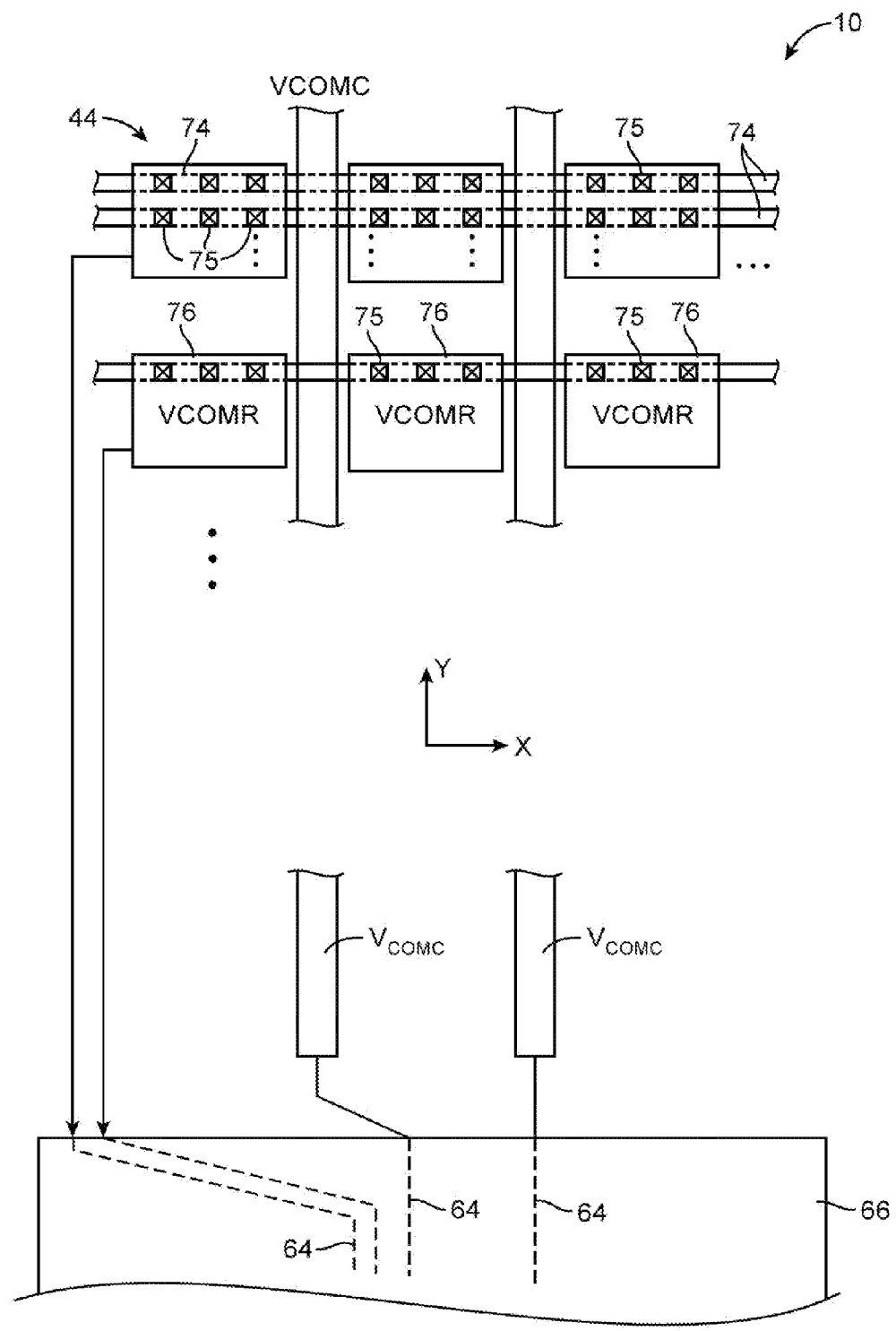
FIG. 5 is a top view of a portion of a display showing how cross-lines may be used in implementing touch functionality in accordance with an embodiment of the present invention.

An illustrative layout that may be used in implementing Vcom paths 44 of FIG. 4 for display 10 is shown in FIG. 5. As shown in FIG. 5, display 10 may include Vcom conductor structures 44 such as square Vcom pads 76 that are interconnected using conductive Vcom paths 74 to form Vcom rows (called Vcomr). Vcom paths 74 may sometimes be referred to as jumpers or cross-lines, because paths 74 electrically couple multiple electrodes across a respective Vcom rows without electrically coupling to Vcom columns. Vertical Vcom conductors (called Vcomc) may be interspersed with pads 76.

The Vcomr and Vcomc conductors of FIG. 5 may be formed from indium tin oxide or other transparent conductive material and may be used for supporting both display and touch functions in display 10. For example, a time division multiplexing scheme may be used to allow the Vcom conductive structures to be used both as ground plane structures for pixels 52 (during display mode operations) and as touch sensor electrodes (during touch sensor mode operations).

When pixels 52 of display 10 are being used to display an image on display 10, display driver circuitry 38 (FIG. 3) may, for example, short both Vcomc and Vcomr to a ground voltage such as 0 volts or other suitable voltage (e.g., a fixed reference voltage). In this configuration, the Vcomr and Vcomc conductors may work together to serve as a part of a common ground plane (conductive plane) for display 10. Because Vcomc and Vcomr are shorted together when displaying images in this way, no position-dependent touch data is gathered.

At recurring time intervals, the image display functions of display 10 may be temporarily paused so that touch data can be gathered. When operating in touch sensor mode, the Vcomc and Vcomr conductors may be operated independently, so that the position of a touch event can be detected in dimensions X and Y. There are multiple Vcom rows (Vcomr), which allows discrimination of touch position with respect to dimension Y. There are also multiple Vcom columns (Vcomc), which allows touch position to be determined in dimension X. The Vcomc and Vcomr conductors of FIG. 5 are illustrated schematically as touch sensor electrodes 62 in FIG. 3.

Resolution requirements are typically larger for displaying images than in ascertaining touch location. As a result, it may be desirable to select a size for pads 76 that is larger than the area consumed by each image pixel. There may be, for example, a block of about 60×64 image pixels associated with an area of the size occupied by each touch sensor pad 76 (as an example).

Vcom cross-lines 74 that connect Vcom pads 76 to form Vcom rows may extend across two or more Vcom pads 76. Vcom cross-lines 74 may, for example, be formed from conductive interconnect paths on an underlying display layer (e.g., a patterned metal layer). The conductive interconnect paths may be electrically coupled to Vcom pads 76 by vias 75. Each Vcom pad 76 may be coupled to underlying conductive interconnect paths by one or more vias 75.

Image pixels may each be characterized by an associated aperture that defines how much light can pass through the image pixel. For example, the aperture of an image pixel determines how much light from an underlying backlight passes through the image pixel. The aperture of the image pixel may be defined by the amount of transparent area of the image pixel (e.g., relative to the amount of opaque area associated with opaque transistor structures, metal lines, etc.). In scenarios such as FIG. 5 in which a display 10 is provided with integrated touch functionality, metal paths such as cross-lines 74 can reduce the aperture of image pixels that are covered by the metal paths.

Figure 6:
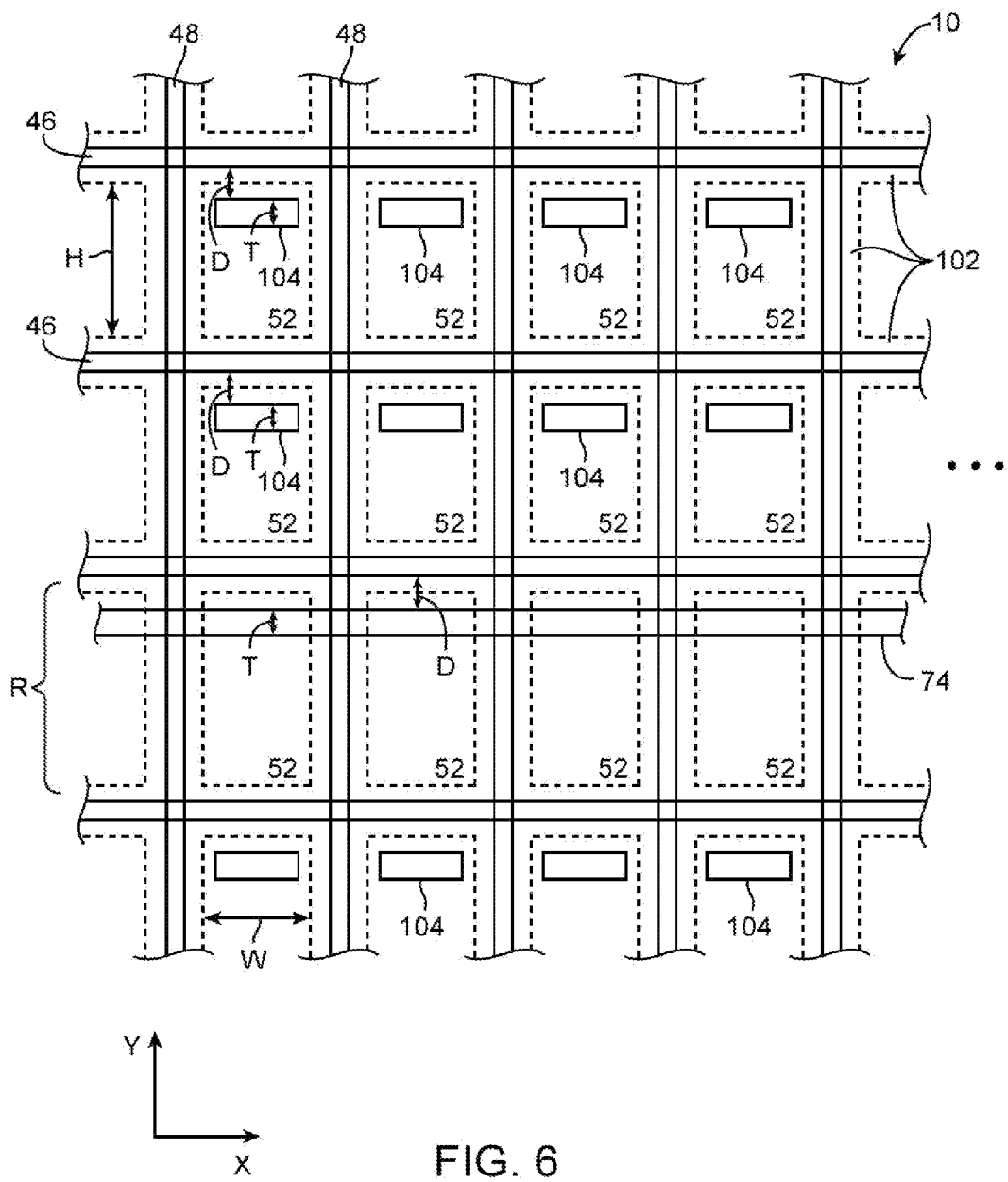
FIG. 6 is a top view of a portion of a display showing how dummy structures may be used to help ensure display uniformity in accordance with an embodiment of the present invention.

FIG. 6 is an illustrative top view of a display including an array of image pixels 52. Image pixels 52 may cover a portion of a Vcom pad such as Vcomr or Vcomc of FIG. 5. The aperture of image pixels 52 may be substantially defined by an opaque grid 102 that is overlaid with the pixel array. The pixel array may include structures such as gate lines 46 and data lines 48 that are covered by opaque grid 102. The aperture of each image pixel 52 may be at least partially defined by height H and width W of openings in opaque grid 102 that allow light to pass. Opaque grid 102 may be formed in any desired display layer covering thin-film structures such as transistor structures, gate lines, data lines, etc. For example, opaque grid 102 may be implemented as a black matrix structure in color filter layer 12 (FIG. 2) or may be implemented as a patterned metal grid in a metal layer of TFT layer 14 (FIG. 2).

As shown in FIG. 6, cross-line 74 covers portions of image pixels 52 of row R. Cross-line 74 obscures some portions of the openings in opaque grid 102, which reduces the available transparent area of image pixels of row R and thereby reduces the aperture of the image pixels. The aperture of each image pixel 52 in row R may be reduced by an area of path thickness T of cross-line 74 times width W of the image pixel.

In general, jumpers such as cross-line 74 may only reduce the aperture of a subset of image pixels. In the example of FIG. 6, row R may be affected by the presence of cross-line 74, whereas the other remaining rows may be unaffected. To help reduce visual artifacts associated with uneven image pixel aperture characteristics, the remaining rows may be provided with opaque dummy structures such as dummy lines 104. Dummy structures are not used to convey display signals such as data or control signals. Each dummy line 104 may have width T and extend across substantially all of a corresponding image pixel 52 (e.g., dummy lines 104 may each have a width of approximately W). Each dummy line 104 may be formed at a location within the corresponding image pixel 52 that approximates the location of cross-line 74 within image pixels 52 of row R. For example, dummy line 104 may be formed at distance D from an adjacent gate line 46. Dummy lines 104 may serve to adjust the aperture of each image pixel 52 to match the aperture of image pixels 52 in row R, thereby helping to ensure that the image characteristics (e.g., brightness) of the image pixels in display 10 are even and consistent. In other words, dummy lines 104 partially define the aperture of corresponding image pixels 52.

By providing image pixels with dummy lines 104, the area covered by opaque grid 102 may be reduced, because it is not necessary to cover cross-lines such as cross-line 74 while ensuring that each image pixel 52 has substantially similar aperture characteristics. The edges of grid 102 may therefore be shifted away from cross-line 74 and dummy lines 104, which helps to increase the transparent area of image pixels 52 and at least partially offset the reduction of transparent area associated with cross-line 74 and dummy lines 104. This example is merely illustrative. If desired, grid 102 may, if desired, cover some or all of cross-line 74 and dummy lines 104.

Figure 7:
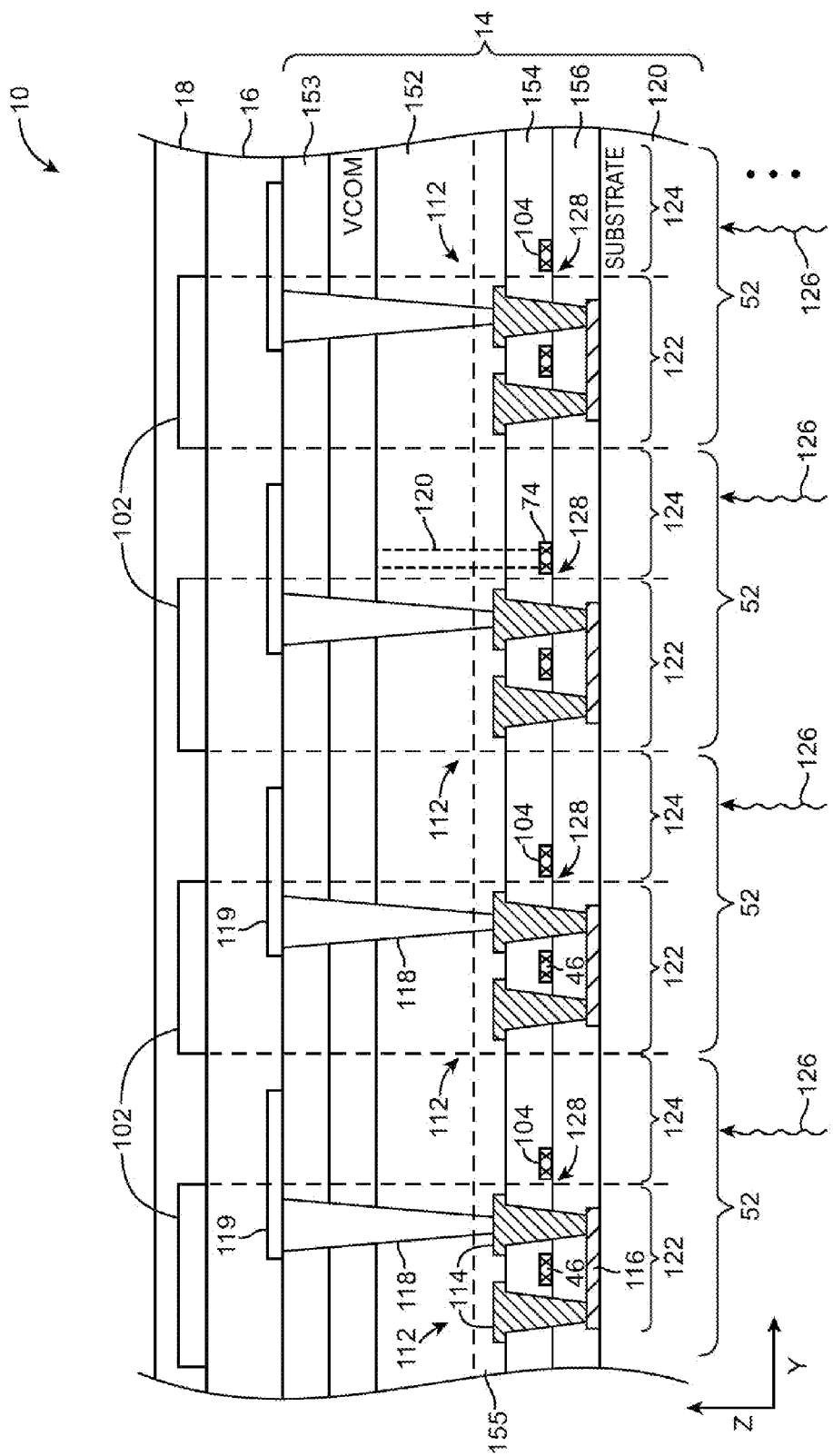
FIG. 7 is a cross-sectional side view of a portion of a display showing how dummy structures may be used to help ensure display uniformity in accordance with an embodiment of the present invention.

FIG. 7 is an illustrative cross section of display 10 along axis Y of FIG. 6. As shown in FIG. 7, TFT layer 14 of display 10 may include one or more display layers such as passivation layers (e.g., layers of silicon nitride or silicon oxide), organic layers (e.g., layers of acrylic materials). For example, display layers 156, 154, and 153 may be passivation layers, whereas display layer 152 may be an organic layer. Conductive materials such as metal or metal alloys may be deposited and patterned in each of the display layers to form structures such as interconnects and transistor structures. Layers in which conductive paths are formed may sometimes be referred to as metal layers. For example, layer 156 may be referred to as a first metal layer (M1), whereas layer 154 may be referred to as a second metal layer (M2). If desired, additional metal layers may be formed. For example, optional metal layers such as metal layer 155 (M3) may be formed over underlying metal layers.

Each image pixel may include transistor structures 112 that are formed in TFT layer 14. The transistor structures may include source-drain structures 114, gate structures 46, and channel structures 116. Channel structures 116 may be formed from semiconductor material such as amorphous silicon, indium gallium zinc oxide, or polysilicon deposited on display substrate 120. The transistor structures may be electrically coupled to pixel electrodes 119 by vias 118 that extend through display layers (e.g., through passivation and/or organic layers).

Pixel electrodes 119 may be provided with pixel data signals by transistor structures 112 that are used in controlling liquid crystal layer 16. Regions 122 of image pixels 52 that include transistor structures 112 are covered by opaque grid 102 and therefore prevent light 126 (e.g., light provided by underlying backlight structures) from passing. Opaque grid 102 includes openings over regions 124 that allow light 126 to pass. Cross-line 74 blocks a portion of a corresponding region 124, which reduces the amount of light that passes through that region 124 and reduces the aperture of a corresponding pixel 52. Dummy lines 104 similarly blocks a portion of light 126 in corresponding regions 124, thereby adjusting the aperture of each pixel 52 of display 10 to be substantially similar. The reduction in image pixel aperture may be at least partially alleviated because the area of opaque grid 102 may be reduced to cover only transistor structures 112 (and not cross-line 104), which produces gaps 128 between the edges of opaque grid 102 and dummy lines 104 and cross-lines 74. Gaps 128 allow light 126 to pass and therefore increases image pixel aperture.

In the example of FIG. 7, opaque grid 102 is formed as an opaque grid in color filter layer 12 and may sometimes be referred to as a black matrix or black matrix grid. However, this example is merely illustrative. If desired, opaque grid 102 may be formed on display layers within TFT layer 14. For example, opaque grid 102 may be formed as a patterned metal layer on a passivation layer over display substrate 120 (e.g., opaque grid 102 may be formed in metal layer 155).

The example of FIG. 7 in which cross-line 74 and dummy lines 104 are formed in the same plane as gate lines 46 (e.g., coplanar) is merely illustrative. If desired, dummy lines 104 may be formed on any desired display layer such as other metal layers. For example, dummy lines 104 may be formed by patterning a conductive material that is deposited on a passivation layer above or below gate lines 46.

In the examples of FIGS. 6 and 7, dummy lines 104 are not connected to any signal lines. Dummy lines 104 may sometimes be referred to as floating nodes or floating voltage nodes, because dummy lines 104 are at floating potentials. If desired, dummy lines may be extended to form cross-lines that span multiple image pixels as shown in FIG. 8.

Figure 8:
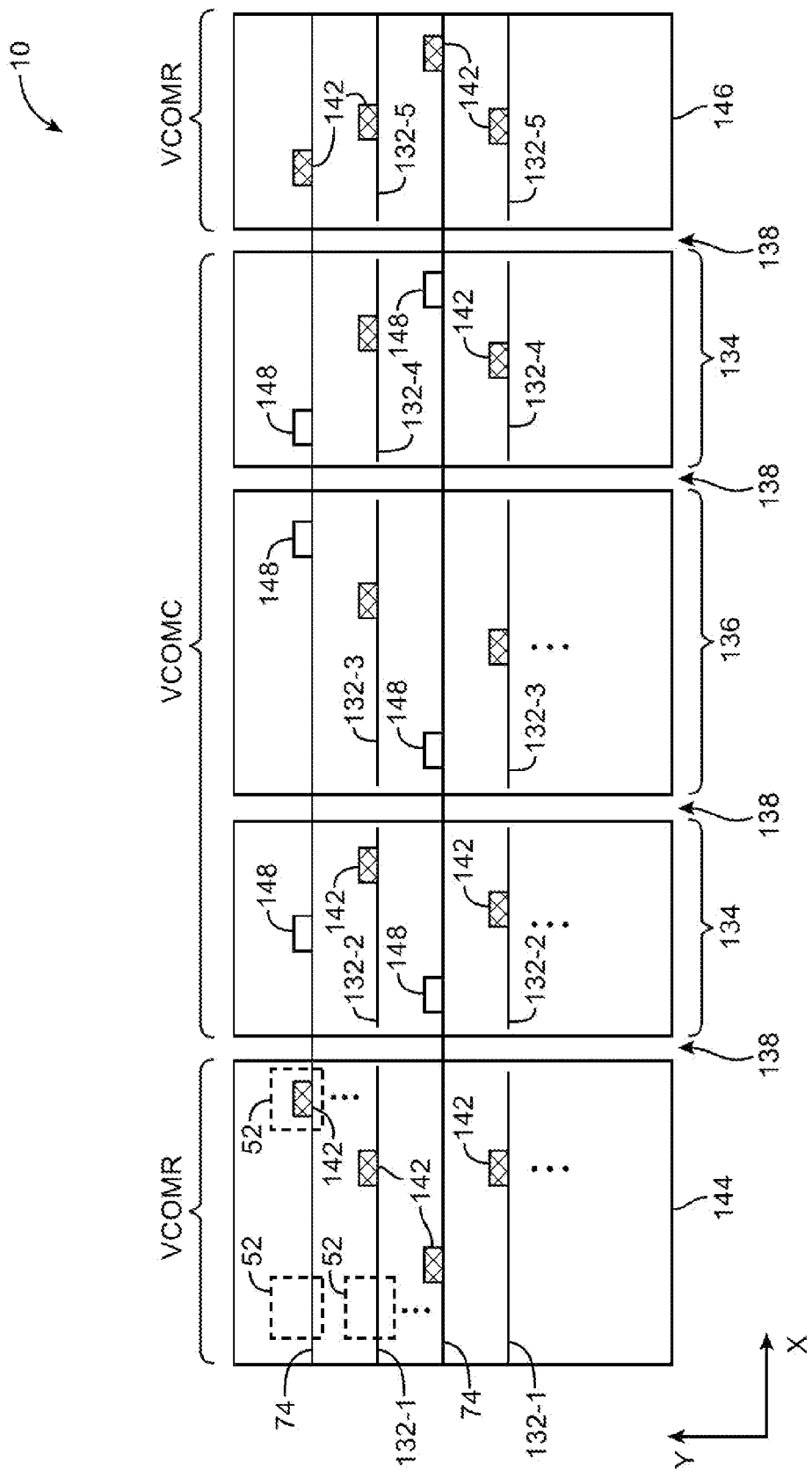
FIG. 8 is a top view of a portion of a display showing how dummy cross-lines may be used to help ensure display uniformity in accordance with an embodiment of the present invention.

As shown in FIG. 8, display 10 may include cross-lines 74 and cross-lines 132. Cross-lines 74 may traverse multiple Vcom regions such as Vcom column and row regions and may sometimes be referred to herein as inter-region cross-lines. Each Vcom region may include a Vcom electrode such as a row or column electrode that covers a respective portion of the pixel array. Cross-lines 132 may traverse image pixels of respective Vcom regions. Cross-lines 132 may sometimes be referred to herein as intra-region cross-lines, because each cross-line 132 traverses only image pixels within the respective Vcom region.

Vcom columns may be partitioned into multiple portions. In the example of FIG. 8, Vcom column Vcomc is partitioned into peripheral portions (regions) 134 and central portion (region) 136. Peripheral portions 134 and central portion 136 may be electrically isolated from each other during touch operations (e.g., peripheral portion 134 and central portion 136 may be separated by gaps 138). Peripheral portions 134 may help to prevent parasitic coupling such as capacitive coupling between row touch signals on pad Vcomr and column touch signals on portion 136 of Vcomc. Peripheral portions 134 may therefore sometimes be referred to as guard structures or guard portions of Vcomc. Guard portions 134 may be supplied with a common voltage (e.g., guard portions 134 may be shorted to a common supply terminal).

Inter-region cross-lines 74 are used to electrically couple Vcom rows and are coupled to Vcomr conductors by via structures 142. Each Vcom row is provided with a set of one or more inter-region cross-lines 74 that extend across the Vcom row. Each inter-region cross-line 74 reduces the aperture of image pixels 52. The aperture of image pixels 52 that are not affected (e.g., that are not covered) by inter-region cross-lines 74 may be adjusted by intra-region cross-lines 132. Each Vcom portion may be provided with intra-region cross-lines 132 that extend in parallel with cross-lines 74 across that Vcom portion. Each intra-region cross-line 132 may partially cover a respective row of image pixels 52 that are not covered by inter-region cross-lines 74 to help ensure that the aperture of each image pixel 52 is substantially similar.

Each Vcom region may be provided with a set of corresponding intra-region cross-lines 132 (e.g., a set of dummy cross-lines). For example, an intra-region dummy cross-line 132 may be provided for each row of image pixels in a given Vcom region that is not covered by inter-region cross-lines 74. In the example of FIG. 8, Vcom row region 144 is provided with intra-region cross-lines 132-1, Vcom column peripheral regions 134 are provided with respective sets of intra-region cross-lines 132-1 and 132-2, Vcom central region 136 is provided with intra-region cross-lines 132-3, and Vcom row region 146 is provided with intra-region cross-lines 132-5. This example is merely illustrative. Vcom regions may be provided with any desired number of intra-region cross-lines 132 to adjust the aperture characteristics of image pixels to help ensure consistent pixel characteristics across display 10.

Dummy cross-lines 132 and cross-lines 74 may be electrically coupled to Vcom conductors by via structures 142. Inter-region cross-lines 74 are used to couple Vcom row conductors and are only provided with via structures 142 within Vcom row regions. For example, Vcom electrodes in row regions 144 and 146 may be electrically coupled to inter-region cross-lines 74 by via structures 142, whereas via structures 142 may be omitted in column regions 134 and 136 (e.g., column conductors Vcomc are not electrically shorted to inter-region cross-lines 74).

Intra-region cross-lines 132 of each region may be electrically coupled to that region by via structures 142. For example, intra-region cross-lines 132-1 may be coupled to Vcom row region 144, intra-region cross-lines 132-2 and 132-4 may be coupled to respective Vcom column peripheral regions 134, intra-region cross-lines 132-3 may be coupled to Vcom column central region 136, and intra-region cross-lines 132-5 may be coupled to Vcom row region 146. By electrically coupling intra-region cross-lines 132 to corresponding Vcom electrodes, parasitic coupling through the intra-region cross-lines 132 between signal paths such as data or gate paths may be reduced (e.g., because any signals that are coupled onto dummy cross-lines 132 via parasitic coupling are shorted to a common supply node).

Via structures 142 may cover portions of image pixels 52 and potentially reduce the aperture of the covered image pixels. However, Vcom column regions include via structures 142 for intra-region cross-lines 132 but do not include via structures 142 for inter-region cross-lines 74. To help ensure display brightness uniformity, inter-region cross-lines 74 may be provided with dummy via structures 148 in Vcom column regions.

Dummy via structures 148 may cover area equal to or substantially similar to via structures 142 without electrically coupling inter-region cross-lines 74 to Vcom conductors. Dummy via structures 148 may be partially formed via structures. For example, dummy via structures 148 may include only contacts for cross-lines 74 that are not electrically coupled to any through-hole structures. The contacts may be formed in the same metal layer as cross-lines 74 or may be formed in any desired metal layer.

Figure 9:
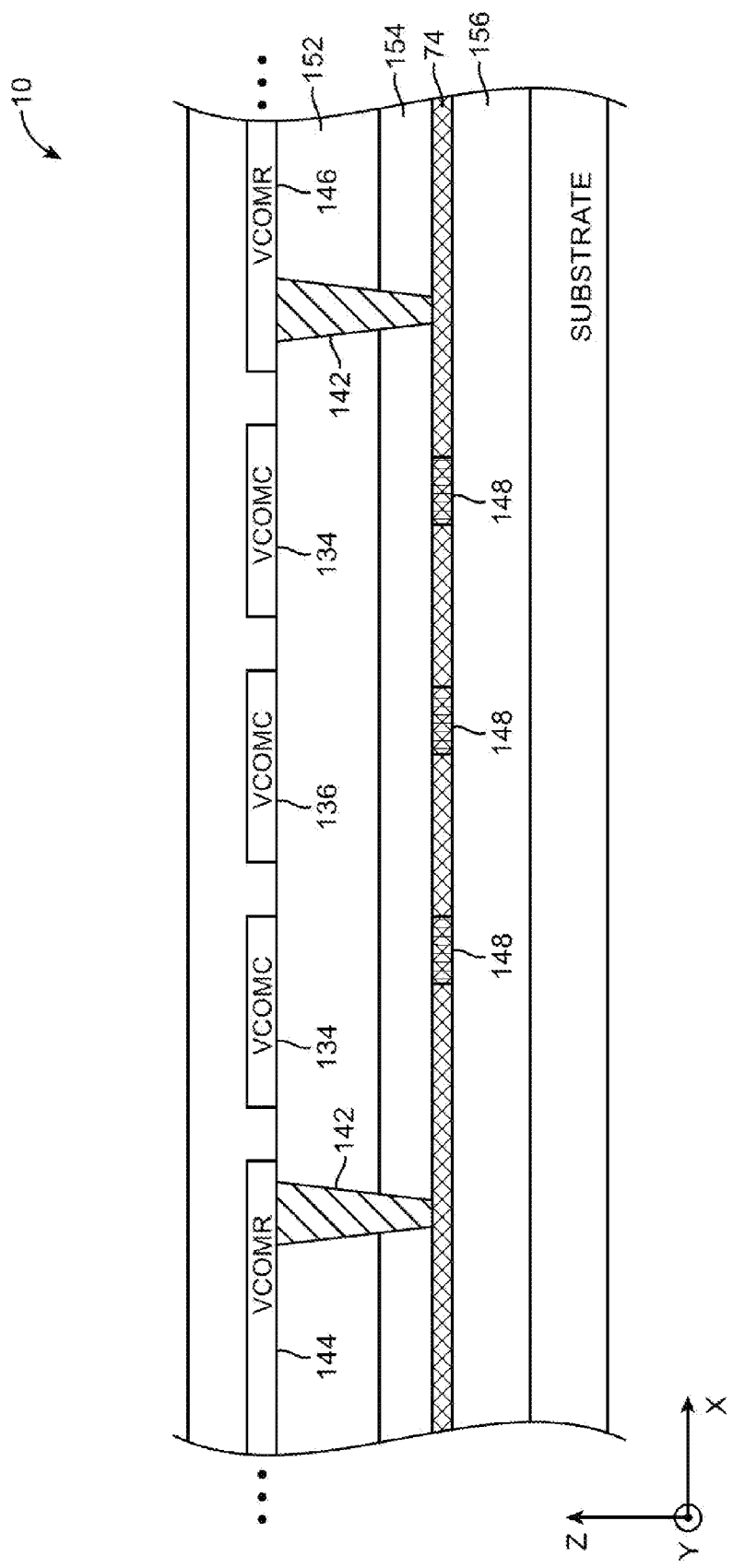
FIG. 9 is a cross-sectional side view of a portion of a display showing how cross-lines may be provided with dummy via structures to help ensure display uniformity in accordance with an embodiment of the present invention.

FIG. 9 is an illustrative cross-sectional view of display 10 taken across an inter-region cross-line 74 of FIG. 8 along the X axis. As shown in FIG. 9, inter-region cross-line 74 formed on passivation layer 156 may span multiple Vcom regions (e.g., regions 144, 134, 136, and 146). Inter-region cross-line 74 is electrically coupled to Vcom row regions 144 and 146 by via structures 142. Via structures 142 may span one or more display layers such as passivation or organic layers. For example, layer 152 may be a layer of organic material such as acrylic, whereas layer 154 may be a passivation layer. Dummy via structures 148 that cover substantially the same amount of area (X-Y area) on display 10 as via structures 142 may be formed in inter-region cross-lines 74. Dummy via structures 148 may extend into or out of the page along axis Y.

Figure 10:
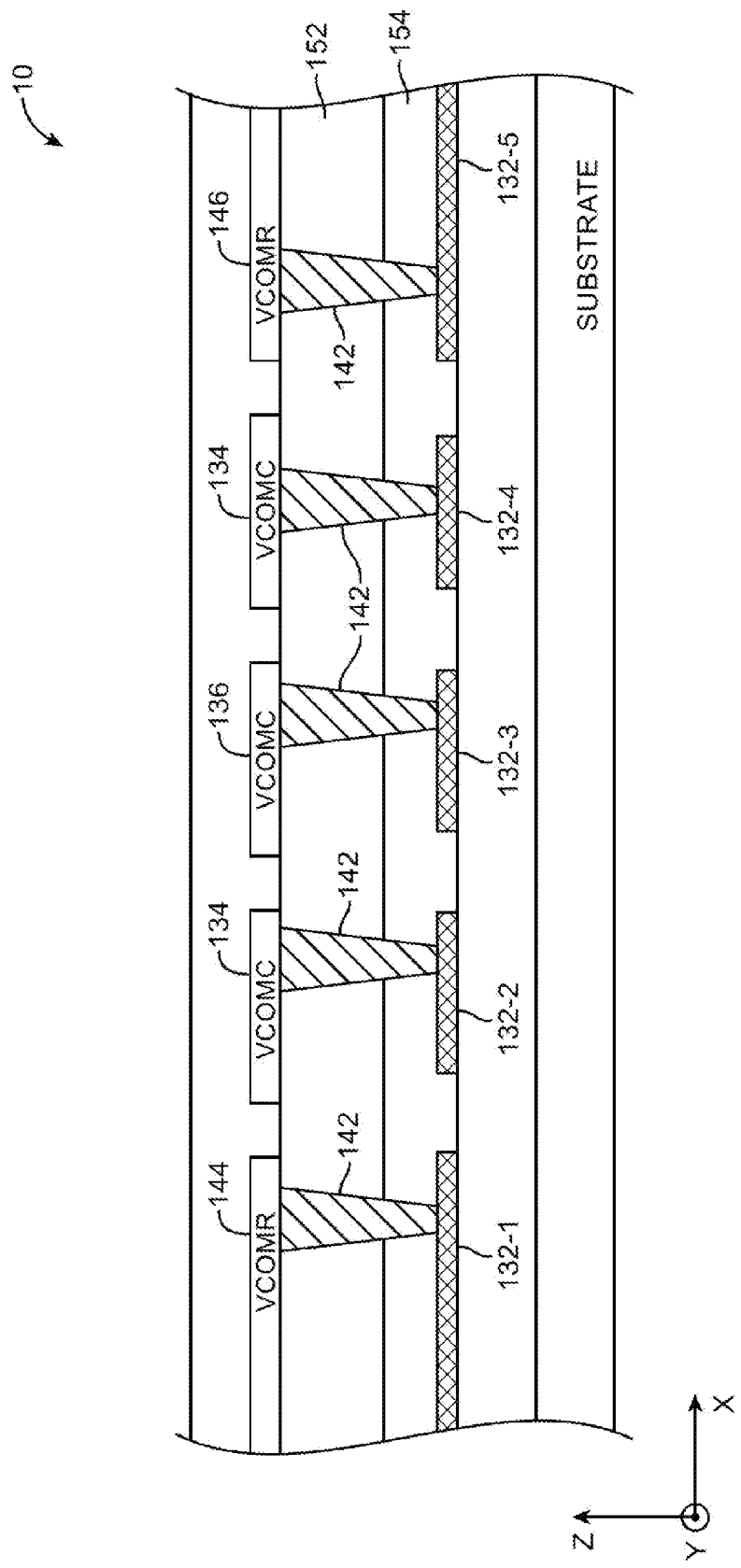
FIG. 10 is a cross-sectional side view of a portion of a display showing how dummy cross-lines may be electrically shorted to a common electrode to help reduce cross-talk in accordance with an embodiment of the present invention.

FIG. 10 is an illustrative cross-sectional view of display 10 taken across intra-region dummy cross-lines of FIG. 8 along the X axis. As shown in FIG. 10, intra-region cross-lines 132 are each electrically coupled to respective Vcom regions by conductive via structures 142 that extend through one or more display layers (e.g., cross-line 132-1 may be coupled to conductors of region 144, cross-line 132-2 may be coupled to conductors of region 134, etc.). Via structures 142 may help to reduce cross-talk between signal paths. For example, via structures 142 electrically shorts dummy cross-lines to Vcom regions, which helps prevent parasitic coupling through dummy cross-lines 132 between signal paths such data and gate signal paths.

The foregoing is merely illustrative of the principles of this invention and various modifications can be made by those skilled in the art without departing from the scope and spirit of the invention. The foregoing embodiments may be implemented individually or in any combination.

What is claimed is:

1. A display, comprising:
   at least first and second pixels;
   a conductive path that covers a first portion of the first pixel;
   a dummy structure that covers a second portion of the second pixel; and
   an opaque grid having a first opening that overlaps the first pixel and a second opening that overlaps the second pixel.

2. The display defined in claim 1 further comprising a common electrode layer that is coupled to the conductive path.

3. The display defined in claim 2 wherein the common electrode layer comprises:
   a plurality of row electrodes arranged in rows; and
   a plurality of column electrodes that are interposed between the row electrodes of each row, wherein the conductive path electrically couples the row electrodes.

4. The display defined in claim 3 further comprising:
   touch circuitry coupled to the plurality of row electrodes and plurality of column electrodes.

5. The display defined in claim 3 further comprising:
an array of pixels arranged in pixel rows and pixel columns, wherein first pixel is included in a first pixel row of the array of pixels and wherein the second pixel is included in a second pixel row of the array of pixels.

6. The display defined in claim 5 wherein each row electrode of the plurality of row electrodes and each column electrode of the plurality of column electrodes covers a respective portion of the array of pixels.

7. The display defined in claim 6 further comprising:
a backlight, wherein light from the backlight is passed through the first and second openings,
wherein the first portion of the first pixel that is covered by the conductive path is within the first opening and wherein the second portion of the second pixel that is covered by the dummy structure is within the second opening.

8. The display defined in claim 7 further comprising:
a color filter layer, wherein the opaque grid comprises a black matrix structure in the color filter layer.

9. The display defined in claim 7 further comprising:
a display substrate, wherein each pixel of the array of pixels comprises thin film transistor structures on the display substrate; and
a metal layer over the display substrate, wherein the opaque grid comprises patterned metal in the metal layer.

10. The display defined in claim 9 wherein the thin film transistor structures of each pixel of the array of pixels comprise:
a channel structure;
a gate structure; and
source-drain structures.

11. The display defined in claim 10 wherein the dummy structure of the second pixel comprises a floating metal path that is coplanar with the gate structure of the second pixel.

12. The display defined in claim 6 wherein the first pixel is covered by a given row electrode of the common electrode layer and wherein the dummy structure comprises a metal path that extends across each pixel of the first pixel row that is covered by the given row electrode.

13. The display defined in claim 12 further comprising a via structure that electrically couples the metal path to the given row electrode.

14. A display, comprising:
a first image pixel characterized by a first aperture;
a second image pixel characterized by a second aperture;
a dummy structure that at least partially defines the second aperture to match the first aperture; and
a backlight, wherein the first and second image pixels receive light from the backlight, wherein the first image pixel passes a first portion of the received light corresponding to the first aperture, and wherein the second image pixel passes a second portion of the received light corresponding to the second aperture.

15. The display defined in claim 14 wherein the dummy structure prevents at least a portion of the light received by the second image pixel from passing through the second image pixel.

16. The display defined in claim 14 wherein a portion of the first image pixel having a first area is covered by an opaque signal path, wherein the dummy structure comprises a floating metal path that partially covers the second image pixel, and wherein the floating metal path has a second area that is substantially equal to the first area.

17. The display defined in claim 15 further comprising:
a pixel array having a plurality of image pixels arranged in rows and columns, wherein the first image pixel is in a first row of the pixel array and wherein the second image pixel is in a second row of the pixel array;
a plurality of common electrodes that each covers a respective portion of the pixel array, wherein the dummy structure comprises a metal path that covers at least two pixels of the second row of image pixels; and
a via structure that electrically couples the metal path to a given common electrode of the plurality of common electrodes.

18. A touch screen display, comprising:
a common electrode layer having row electrodes arranged in rows and column electrodes interposed between the row electrodes of each row;
touch sensor circuitry coupled to the row and column electrodes;
a cross-line that electrically couples the row electrodes of a given row; and
a dummy cross-line that extends across a given row electrode of the given row.

19. The touch screen display defined in claim 18 further comprising:
an array of pixels characterized by respective pixel apertures, wherein each electrode of the common electrode layer covers a respective portion of the array of pixels, wherein the apertures of a first portion of the pixels covered by the given row electrode are defined at least partly by the cross-line, and wherein the apertures of a second portion of the pixels covered by the given row electrode are defined at least partly by the dummy cross-line.

20. The touch screen display defined in claim 19 wherein the dummy cross-line comprises one of a plurality of dummy cross-lines that extend across the given row electrode in parallel with the cross-line and wherein each dummy cross-line of the plurality of dummy cross-lines is electrically coupled to the given row electrode by a respective via structure.

21. The touch screen display defined in claim 19 wherein the cross-line is electrically coupled to each row electrode of the given row by a respective via structure, the touch screen display further comprising:
a set of dummy cross-lines for each column electrode that is interposed between the row electrodes of the given row.

22. The touch screen display defined in claim 21 further comprising:
via structures that electrically couple the set of dummy cross-lines to the column electrodes that are interposed between the row electrodes of the given row, wherein each via structure has a first area; and
dummy via structures that are coupled to portions of the cross-line that covered by the column electrodes, wherein each dummy via structure has a second area that is substantially equal to the first area.

23. The touch screen display defined in claim 22 wherein the dummy via structures comprise dummy via contact pads.

24. The display defined in claim 1 further comprising a backlight, wherein light from the backlight is passed through the first and second openings.

* * * * *